A. GRANGER.
FOREIGN BODY LOCALIZER.
APPLICATION FILED JULY 17, 1919.

1,370,640.

Patented Mar. 8, 1921.
4 SHEETS—SHEET 1.

A. GRANGER.
FOREIGN BODY LOCALIZER.
APPLICATION FILED JULY 17, 1919.

1,370,640.

Patented Mar. 8, 1921.
4 SHEETS—SHEET 2.

Witnesses:
Harry R. L. White
W. P. Kilroy

Inventor:
Amédée Granger
By Brown Boettcher Dinne
Attys.

A. GRANGER.
FOREIGN BODY LOCALIZER.
APPLICATION FILED JULY 17, 1919.

1,370,640.

Patented Mar. 8, 1921.
4 SHEETS—SHEET 3.

Witnesses:
Harry R. White.
W. P. Kilroy

Inventor:
Amédée Granger.
By Brown, Boettcher & Dieuwi
Attys.

UNITED STATES PATENT OFFICE.

AMÉDÉE GRANGER, OF NEW ORLEANS, LOUISIANA.

FOREIGN-BODY LOCALIZER.

1,370,640.  Specification of Letters Patent.  Patented Mar. 8, 1921.

Application filed July 17, 1919. Serial No. 311,590.

*To all whom it may concern:*

Be it known that I, AMÉDÉE GRANGER, a citizen of the United States, residing at New Orleans, in the parish of Orleans and State of Louisiana, have made certain new and useful Improvements in Foreign-Body Localizers, of which the following is a full, clear, and concise description.

My invention relates generally to foreign body localizers and more particularly to such localizers as are employed for the localization of foreign bodies by means of the X-rays, employing a practical application of the law of triangulation known as the parallax method of localization. Although it has been previously proposed to employ devices for the above purpose wherein use is made of the well-known law of triangulation and although many devices making use of this law have gone into use, it is found that a large majority of such devices are complicated and require for their proper use a technical knowledge and skill not possessed except by highly trained radiologists, or they are not accurate under varying conditions of practical use; and also with a large majority of these devices the time required for the localization is too long for them to be of very great service under conditions where time is an important factor. Also where the rays are employed for any considerable length of time as is necessary in the case of some of these devices of the prior art, the intensity of the rays must be kept down to avoid injury to the patient or roentgenologist (an operator skilled in the use of the roentgen ray or X-ray apparatus being termed a roentgenologist) so that in the use of such devices the image of the foreign body is not as sharply defined on the fluoroscopic screen as may be the case with my improved device wherein the localizing operations are performed in a very short time on account of the few simple manipulations of the apparatus required.

An object of my invention therefore is to provide a device of this nature, which is simple in construction, and so simple to use that any physician, having no previous experience with the X-rays can easily master the technique of its use, without any considerable study, and which device requires so few manipulations that the localization operation can be made with it in a minimum length of time.

Another object of my invention is to provide a device of this character which is simple and sturdy in construction, and in which the parts may be differently adjusted to suit the varying conditions had in practice, and which parts may be securely retained in such an adjustment.

Other objects of my invention and the invention itself will be apparent to those skilled in the art to which it appertains by reference to the following description of my invention, in which description reference is had to the accompanying drawings forming a part of this specification.

Referring to the drawings, in Figure 1, I show a perspective view of a localizer which is an embodiment of my invention, the localizer comprising a base plate A, an upright standard J and a pointer T, each of these parts being adjustable with respect to the others. A fluoroscopic screen holder V is shown carried by an adjustable rod W upon the upright standard J.

Fig. 1, shows in schematic form an X-ray tube held in a holder or box and which is assumed to be differently placed at the same distance below the base plate of the localizer when the same is in use.

Fig. 4 is a cross section taken on the line 4—4 of Fig. 15. This figure shows a cross-sectional view of the base plate A and of the base K of the standard J secured to the said base plate, a portion only of the upright standard member J being shown in this figure. A side view of the standard base is illustrated in Fig. 7, the clamping means L being illustrated in detail in Figs. 4 and 7.

Figure 1:
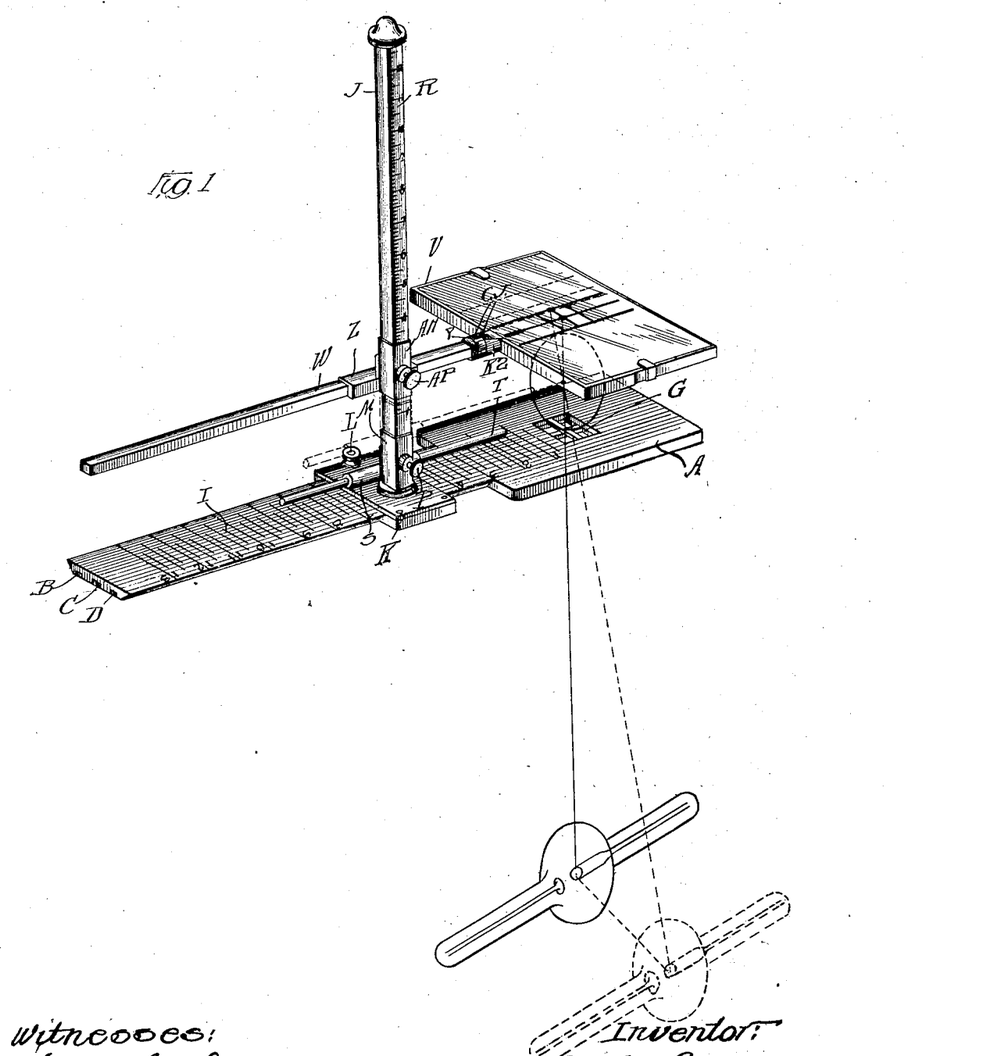

Referring now to the drawings in all of which like parts are designated by like reference characters and referring particularly to Fig. 1 supplemented by reference to the other figures for the sake of clearness, at A is shown the base plate of the localizer illustrated which is the embodiment of my invention.

Figure 2:
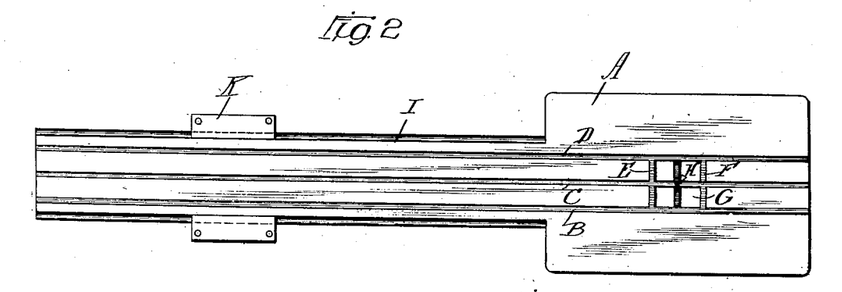
Fig. 2, shows a bottom view of the base plate of the localizer illustrated in Fig. 1.
Figure 3:
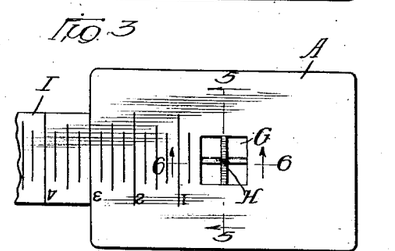
Fig. 3, shows a top view of the enlarged end of the base plate A, illustrated in Figs. 1 and 2.
Figure 4:
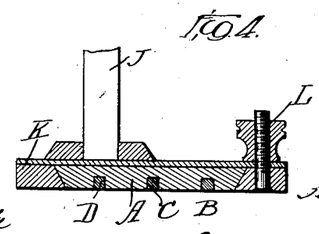
Figure 5:
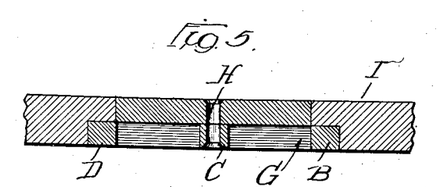
Figs. 5 and 6 are cross-sectional views of a portion of the enlarged end of the base plate A, Fig. 5, showing a cross-sectional view on a line 5—5 and Fig. 6, being a cross-sectional view on a line 6—6, the reference numerals being indicated in Fig. 3.
Figure 6:
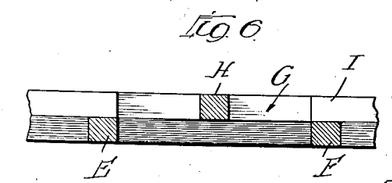
Figure 7:
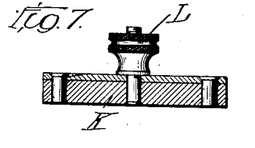
Fig. 7 is a fragmentary cross sectional view taken on the line 7—7 of Fig. 15 illustrating a detail of construction.

This plate A, is made of one-quarter inch aluminum with a square opening at G. Within this square is a cross H formed by two pieces of one-eighth inch brass or bronze bars intersecting at the center of the square, and having a small hole through the center of the point of intersection. On the under surface of the plate are three guide lines B, C, D made of one-enghth inch brass or bronze bars, these lines forming two of the sides of the square G and one arm of the cross H. The other two sides, E and F, of the square and the other arm of the cross H, are formed by smaller and similar pieces of one-eighth inch bars. On the upper surface of the plate A, at I, is a scale graduated in one-quarter inch divisions, beginning with the small hole in the center of the metal cross H as zero. One portion of the plate is cut and shaped to receive the base of the upright standard J. The center of the cross H serves as a zero reference point both for the scale I and also for centering the foreign object to be localized as will be described later.

The upright standard J is preferably a square rod fitted to the base K, which is movable on the plate A, and which may be fixed at any desired point on the said plate by means of the thumb-screw L; on one side, R, of the standard J, is a scale graduated preferably in one-sixteenth inch divisions. The small carriage M is movable vertically on the square upright standard J, to which it may be fixedly secured at any point by means of the thumb-screw P. The carriage M comprises a sleeve S to receive the pointer T, which pointer may be moved horizontally within the sleeve and fixed at any desired point within it by means of the thumb-screw U.

When the three parts are assembled as is the case in Fig. 1, the pointer T is held directly over the middle bronze guide C. The pointer T can be moved along this guide in the direction of its length in several ways, first by sliding the base K of the upright standard J on the plate A and second, it can be moved so that its end may approach the cross H to any desired extent by slidably moving it within the sleeve S which is carried by the member M. The pointer T can also be moved to and from the plate A by slidably moving the carriage M on the vertical upright standard J. The distance from the end of the pointer T to the point of cross-section of the cross arms H may be read on the scale I, marked on the upper surface of the plate A. The distance from the center of the pointer T, to the upper surface of the plate A may be read off on the scale R, marked on the surface of the vertical upright standard J.

The fluoroscopic screen holder V is carried on the upright standard J above the carried pointer T, the screen holder rod W being secured to the said standard in the same way as is the pointer rod T. That is, the screen holder rod W, which is of square cross-section, is slidably carried by the sleeve Z, which is integral with the carriage AM, and which is slidably mounted on the standard J above the similar carriage M for the pointer; the carriage AM may be secured at any point on the upright standard J by means of the thumb-screw AP. A clamping screw AU is provided to securely clamp the square screen holder rod W to the carrying sleeve Z.

Figure 8:
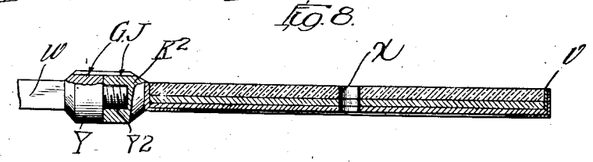
Fig. 8 is a cross sectional view taken on the line 8—8 of Fig. 15 of the fluoroscopic screen holder V and the mechanical joint X whereby the screen holder is removably secured to the screen carriage rod W.
Figure 9:
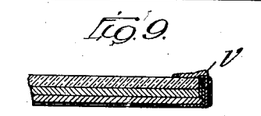
Fig. 9, shows a cross-sectional view taken on line 9—9 of Fig. 15 of a portion, only, of the screen holder V.

Referring to Fig. 8, showing the means by which the screen holder V is secured to the screen holder rod W, the rod W is provided with an enlarged end Y of circular cross-section which has a tip $Y^2$ of reduced cross-section and which tip is externally threaded. The fluoroscopic screen holder V shown in Figs. 1 and 8 is provided with a knob $K^2$ having the same outside diameter as the end Y of the rod W, the knob $K^2$ being recessed and having an internal thread in the said recess adapted to match the external thread on the tip $Y^2$, so that the knob $K^2$ and therefore the screen holder B may be screwed upon the tip $Y^2$ to secure the said screen holder, to the rod W.

It is desirable when the screen holder is in place that it lie in a plane parallel to the plane of the base A, and this is insured by marking the upper joining surfaces of the joined members, which marking in the embodiment illustrated, is accomplished by a groove, GJ, thereon; the screen holder is then screwed upon the rod W until the grooves on the enlarged end of the rod and on the screen holder knob K² coincide.

A better understanding of the localizer of my invention will be had from the description of the operation of the same which follows:

To locate a foreign body it is necessary to have besides the assembled localizer a transparent top table, and an X-ray tube held in a holder or box provided with a diaphragm, placed under this table, and capable of being moved along the longitudinal axis of the table, or in other words movable at substantially right angles to the vertical plane which is determined by the pointer and the reference point which is the intersection of the arms of the cross H. The range of this movement need not be great, twelve inches will suffice for all cases. The patient then is placed on the table, the wounded part lying over the X-ray tube box or holder.

Figure 10:
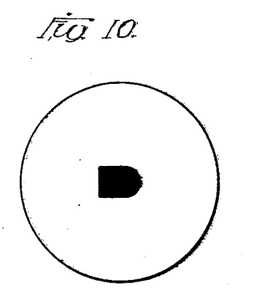
Figs. 10, 11, 12, 13 and 14 are illustrative of the image produced on the fluorescent screen when the device is in operation to locate a foreign article in the body of a patient. These last named figures are illustrative of a specific case taken for the purpose of illustrating various steps in the operation of the device in a typical case.

The technique for the operation of my device can be divided into four short steps, as follows:

First step: The diaphragm of the tube containing box or holder having been previously closed so that a circle of fluorescence only about two inches in diameter, would appear on the screen, the tube is moved until the shadow of the foreign body is seen lying in the very center of this small fluorescent area (Fig. 10).

Figure 11:
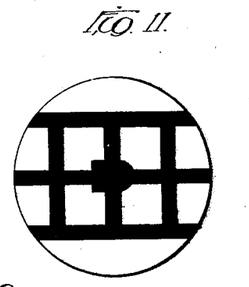

Second step: The localizer base is slipped under the patient, that is, between the patient and the table, the fluorescent screen being located over the patient and the localizer moved so that the shadow of the foreign body is seen lying over the intersection of the cross within the square hole in the plate, (Fig. 11).

Figure 12:
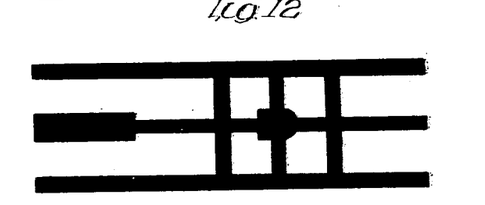
Figure 13:
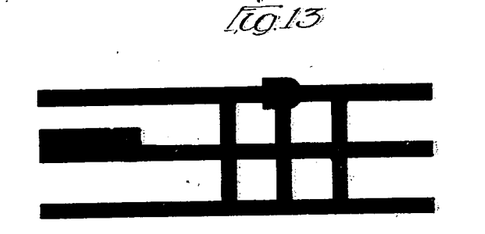

Third step: The diaphragm of the tube containing box or holder is opened, (Fig. 12), and the tube moved laterally until the shadow of the foreign body leaves that of the central guide or central arm of the cross and assumes an identical position with reference to the shadow of one of the lateral guides, (Fig. 13).

Figure 14:
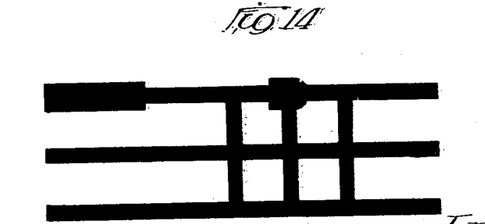
Figure 15:
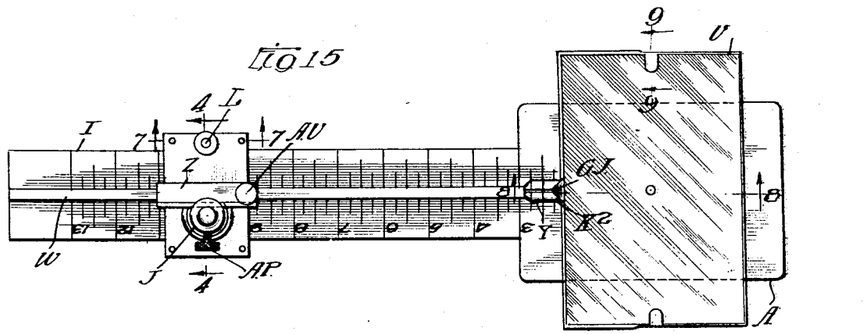
Figs. 15 and 16, show a top view and side elevations respectively of the localizer of Fig. 1.
Figure 16:
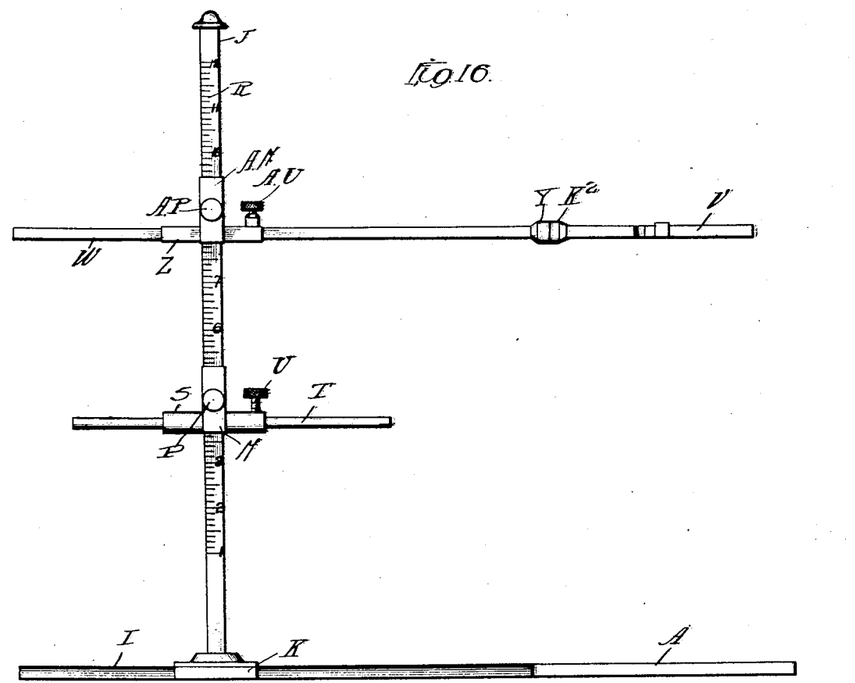

Fourth step: The pointer, (Fig. 1), is now raised, the milled thumb-screw P being released to permit this until its shadow moves over to and very nearly blends with that of the lateral guide mentioned in the preceding step (Fig. 14).

The pointer now lies on a plane with the bullet and indicates its depth in the tissues. These four steps can be made in an ordinary case in not more than forty-five seconds. The pointer can now be pushed against a side of the part being examined and made to press against it (Fig. 1), marking it temporarily, and a needle point of an indelible pencil or the like passed through the small hole in the center of the cross H, and through the vertically alined small hole X provided in the fluoroscopic screen V, making temporary marks at these points of the patient which points would indicate or define a line passing vertically through the foreign body. A point opposite the pointer T can be marked later with a pencil of nitrate of silver, this point with the pointer T defining a line passing through the plane of the foreign body that is on a line with its depth in the tissues. Now lowering the pointer and reading the scale on the upper surface of the plate the distance of the foreign body from the side of the part can be noted in divisions of one-fourth of an inch. Marking the skin and reading the scales could hardly consume more than fifteen seconds or at the outside, thirty seconds, so that the whole procedure including the localization, would take less than one minute and a half.

Fig. 1, illustrates and explains the law employed—law of triangulation—and shows also the *modus operandi.* The solid lines indicate the first position of the tube and the pointer and showing the path of the rays and the relative position of the shadows as they then appear on the fluorescent screen. The dotted lines indicating the changed positions of the tube Step 2 and finder Step 3 and showing the new path of the rays and the new position of the shadows as they would now appear on the fluorescent screen.

My invention consists not only in the means whereby the above results may be accomplished, but also consists broadly in the novel mode of operation herein set forth, whereby such results may be obtained.

Having thus described my invention, it is obvious that my invention may be embodied in structures differing considerably in detail from that herein specifically set forth; I am aware that numerous and extensive departures may be made from the embodiment of my invention herein illustrated and described, without departing from the spirit of my invention, my invention being limited only by the scope of the following claims:—

1. In an X-ray localizer, in combination with a base member, an upright standard on said base member, a pointer slidably mounted on the said standard and non-rotatably fixed thereto, a guide to hold the said pointer and adapted to allow it to be longitudinally adjusted therein, an X-ray responsive plate adapted to be placed in a plane above the said pointer, an X-ray tube located below the said base and adapted to be horizontally moved to different position to project spaced shadows of the said pointer upon the plate, the said pointer, base, standard, and plate arrangement permitting the part of the patient containing a foreign body, to be placed in the path of rays from the said tube to the said plate, whereby correspondingly spaced shadows of the said pointer and foreign body may be produced upon the said plate, the shadow of the pointer in each position of the tube being thus adjustable to the same longitudinal plane, as that of the foreign body, said pointer being movable vertically along the upright independently of the X-ray responsive plate, so that the pointer may be brought into line horizontally with the foreign body to be localized.

2. In an X-ray localizer employing the optical principle of parallax, the combination with a base, of an upright standard affixed thereto a pointer non-rotatably secured to the said standard, a pair of guides in a portion of the said base adapted to underlie the body of a patient, an X-ray tube to project X-ray shadows of the said pointer, the said guides, and of a foreign body upon an X-ray responsive plate, the said base and pointer being adjustable so that with a given X-ray tube position the said pointer, foreign body shadow, and one of the guide shadows will each be positioned in the same vertical straight line, and means permitting a second X-ray tube position to cause a second series of shadows to occur with the shadow of the foreign body coinciding with the shadow of the second guide, and means for adjusting the pointer on the said standard vertically independently of the X-ray responsive plate to cause the shadow of the said pointer to be projected on the said plate in a line with the said foreign body shadow and second guide shadows, said second line of shadows being parallel to the said first named line of shadows.

3. In combination, a base plate having a reference point, said plate being adapted to be placed under the body of a patient, so that the foreign body and the reference point will cast shadows in the same vertical line, a generator of X-rays below the body and adjustable to cast rays upon the screen from a plurality of positions, a fluoroscopic screen adapted to be placed over the body of the patient, a horizontal pointer, the axis of which invariably intersects the vertical line through the zero point, said pointer being adapted to approach the side of the patient's body, said pointer being vertically adjustable in a fixed vertical plane and a guide member coöperating with the zero point, said member and said point being adapted to cast reference shadows upon the screen in the different generator positions, so that the pointer may be brought into horizontal alinement with the foreign body.

4. In combination, a base plate member having a horizontal slide graduated from a zero point in terms of a suitable unit of length to define the horizontal position of the foreign body to be localized, said zero point adapted to cast a recognizable shadow upon an X-ray responsive screen and being adapted to be placed vertically in line with the foreign body to be localized, a vertical standard movable horizontally along said base plate member upon said slide, a horizontal pointer adapted to cast a recognizable shadow, said pointer having its axis invariably in line with a vertical line drawn through the zero point, said standard being graduated vertically to give the vertical position of the foreign body to be localized, reference means coöperating with the zero point for casting a reference shadow upon an X-ray responsive screen, said reference shadow being employed to aid in bringing the shadow of the pointer into line with the shadow of the foreign body, so that the pointer will be in horizontal line with the foreign body and the zero point will be in vertical line with said body, whereby the position of the foreign body to be localized may be read off in rectangular coördinates from the scales on the base and on the vertical standard.

5. In combination, a base plate member having a zero point and having a horizontal slide, a screen responsive to X-rays, said zero point adapted to cast a recognizable shadow upon said screen, a vertical standard movable horizontally along said base plate member on said slide, a horizontal pointer carried on said standard, said pointer being adapted to have its axis invariably intersect a vertical line drawn through the zero point, a reference member adjacent the zero point for casting a reference shadow upon said screen, said reference shadow being employed to aid in bringing the shadow of the pointer into line with the shadow of the foreign body so that the pointer will be in a horizontal line with the foreign body and the zero point will be in vertical line with said body.

6. The method of localizing a foreign body embedded in a body penetrable to X-rays which consists in casting upon a suitable screen a shadow of the body to be localized in a vertical line and at the same time casting the shadow of a reference point in the same vertical line and bringing a horizontal pointer into a vertical plane common to said object to be localized and said reference point and casting the shadow of the pointer on the screen, then moving the source of X-rays at substantially right angles to said latter plane until the foreign body casts its shadow a given distance away from its original position, then moving the pointer in said vertical plane until the shadow of the pointer is cast an equal distance away from its original position, whereby the pointer is brought into horizontal axial alinement with the foreign body to be localized.

7. The method of locating a foreign object embedded in a body penetrable to X-rays, which consists in casting upon a screen the shadow of the foreign object and of a guide in the same line from a first ray center, determining a plane by means of said line and a horizontal pointer, casting from a second ray center a second shadow of the object at a predetermined distance from the first position, then moving the pointer in the first plane until its final shadow position is moved a distance from its first shadow position equal to the predetermined distance which the shadow of the foreign object has moved, whereby the pointer still lies in the first plane and also lies in a second plane determined by the second shadow position of the pointer and the foreign object, said pointer lying invariably at right angles to a vertical plane passing through the two ray centers.

8. The method of locating a foreign object embedded in a body penetrable to X-rays which consists in casting upon a screen the shadow of the object and of a guide in the same vertical line from a first X-ray center, determining a vertical plane by means of said vertical line and a horizontal pointer, casting from a second ray center a second shadow of the object at a predetermined horizontal distance from the first position, then moving the pointer in the first plane vertically parallel to its first position until its final shadow position has moved a distance from its first shadow position equal to the predetermined distance which the shadow of the object traveled, whereby the pointer still lies in the vertical plane and also lies in a second plane, which is determined by the second shadow position of the foreign object of the object itself and which is at right angles to the two ray centers.

9. In combination, a base plate, a reference point in predetermined relation to said base plate, a pointer movable in a vertical plane only, which plane includes said reference point, a reference member supported in fixed relation to the reference point and adapted to define a horizontal line parallel to the said plane, said line lying a predetermined distance therefrom, an X-ray generator adapted to occupy two positions, one being a point in said vertical plane and another being a point in a plane common to the said horizontal line and the pointer when said pointer lies axially in line with the body to be localized and its shadow lies in said horizontal line.

10. In an X-ray localizer, the combination with a vertical standard, having a linear scale marked thereupon, a base to which the said standard may be secured at any desired point in a straight line along the base, said base having a zero reference point definable by X-ray and having a linear scale graduated thereupon starting from said zero point, a pointer rod extending at right angles to the said standard and adapted to be secured at any desired point thereon and invariably lying in a vertical plane including said zero point, the said pointer being adapted to be placed with its end adjacent to the body of a patient, a plurality of relatively impenetrable guides lying in a horizontal plane and defining parallel lines on opposite sides of the zero point, said lines being always parallel to the pointer, a fluorescent screen adapted to be placed over the body of the patient and an X-ray generator located below said body and base and locatable in, but laterally displaceable with respect to the said vertical plane.

11. In an X-ray localizer, the combination with a standard, a linear scale marked on the said standard, a base to which the said standard may be secured at any desired point in a straight line along said base, a linear scale along the said base in the same straight line, a single pointer rod extending at right angles to the said standard and adapted to be secured at any desired scale point thereon, the said pointer being adapted to be placed with its end adjacent to the body of a patient, a plurality of parallel relatively impenetrable straight guides secured to said base, the said guides lying in a horizontal plane and each being parallel to all positions of the said pointer, one of the said guides being disposed in the same vertical plane as the said pointer, a fluorescent screen adapted to be placed over the body of the patient, an X-ray generator locatable in the said vertical plane which contains the said pointer and one of the guides and being movable into another plane which is defined by the pointer and the shadow of one of said guides when the pointer lies axially in alinement with the object to be localized.

12. In an X-ray localizer, the combination with a plate, an upright standard, and a pointer, a square opening in the said plate, a metallic cross in the said opening, the members of the said cross intersecting at right angles at the center of the said square and having a small hole through the center of the point of intersection, three parallel metallic guide bars secured to the said plate, the two outer of the said bars forming two sides of the said square, the intermediate bar forming one arm of the said cross, two other bars secured to the said plate and comprising the other two sides of the said square, a fifth bar parallel to the last named bars and lying between them to form the other arm of the cross, a base affixed to the upright standard, a scale on the upper surface of the said plate, said base being movable on the said plate along the said scale, a second scale linearly disposed on the side of the said standard, said pointer being disposed at right angles to the said standard and capable of being secured at any scaled point on the said standard, said pointer being mounted directly over the first named intermediate guide, and movable along the said guide in the direction of its length, the said base being likewise movable along the scale on the said plate, a fluorescent screen locatable above the said square opening, and an X-ray generator locatable below the said square opening, and capable of being laterally displaced with respect to the said first named guide bars.

13. The method of localizing an object such as a bullet embedded in the body which comprises, establishing a substantially horizontal plane as by means of a fluoroscopic screen, then establishing by the X-rays a vertical plane as determined by the object and by a horizontally extending vertically moving pointer, then establishing by moving the X-ray tube a second plane determined by the object and a guiding line lying in the horizontal plane a given distance away from and parallel to the line formed by the intersection of the horizontal plane and the vertical plane, then moving the pointer vertically until it lies both in the vertical plane and in said second plane, thereby establishing the line formed by the intersection of the vertical plane and the second plane which line passes through the object to be localized.

14. The method of localizing an object which comprises establishing a substantially horizontal plane as determined by a fluoroscopic screen, then establishing a substantially vertical plane by means of the X-rays as determined by the object to be localized and by a horizontally extending vertically movable pointer and casting the shadow of the object and of the pointer upon the line which is the intersection of said horizontal plane and said vertical plane, then moving the X-ray tube laterally substantially parallel to the horizontal plane to cause the shadow of the object to appear at a predetermined distance away from the said line, then moving the pointer vertically until its shadow cast upon the horizontal plane appears at an equal distance away from the line, whereupon the pointer will be in the horizontal line passing through the object.

15. In combination. a fluoroscopic tube shiftable sidewise horizontally from a given position, a standard adjacent the object to be localized, a pointer vertically movable on the standard, a fluoroscopic screen for making visible the fluoroscopic shadow of the pointer and the object to be localized, and means for forming a guide for bringing the shadow of the pointer and the shadow of the object into register at two positions of the tube.

16. The method of localizing an object which comprises projecting a shadow upon a fluorescent screen of a vertically movable pointer and the object to be localized, said shadows being cast in line with each other in one direction, then moving the X-ray tube laterally until the shadow of the object is brought into register with a guiding means located a fixed distance laterally away from the first position of the object, then moving the pointer vertically until the shadow of the pointer falls at an equal distance from the first position of the pointer, then marking the position of the pointer and the line passing through the first position of the shadow of the object and the X-ray tube.

17. In combination a base plate adapted to lie under the patient, a reference point supported in fixed relation to said base plate, a slide on the base plate having a vertical standard, a slide on the vertical standard bearing a horizontal pointer, a second slide on the standard supporting a fluorescent screen adapted to lie on top of the patient, said screen having a marking hole adapted to be placed vertically in line with said reference point, said pointer being adapted to move always in a plane common to said reference point and said marking hole and to be brought axially in line with the object to be localized, said marking hole and said pointer serving as the point on the body of the patient defining a vertical line and a horizontal line respectively, passing through the object to be localized.

18. In a device of the class described, a support having a base adapted to lie under the body of the patient, a member having a zero point adapted to cast a recognizable shadow on a fluorescent screen, said zero point being mounted on said base, a vertical standard having a horizontal pointer adjustable vertically in a vertical plane along said standard and adjustable axially in the same plane, said zero point lying in the same plane as said pointer, said pointer being adapted to cast a recognizable shadow on said screen, a reference member for defining a line parallel to said plane, said reference member being adapted to cast a recognizable shadow on said screen, and a movable source of X-rays lying below the base and being capable of occupying two positions, one lying in said first plane and the other in a plane at right angles to said first plane.

19. The method of localizing a foreign object embedded in a body penetrable to X-rays which consists in (1) casting upon a plane screen the shadow of the object and the shadow of a guide or reference point, (2) bringing said shadows into coincidence by moving the source of X-rays to a first position which is in a first straight line determined by the object and the guide or reference point, (3) determining a first plane by means of the first line and a horizontal pointer the axis of which invariably stands normal to said first line, (4) bringing the shadow of the pointer on the screen into axial alinement with the superposed shadows of the object and of the guide or reference point to define the first position of the pointer, (5) moving the source of X-rays to a second position into a second plane at right angles to the first plane and sufficiently far to cause the shadow of the object to move a predetermined distance from the shadow of the guide or reference point on said screen, (6) then moving the pointer always parallel to its first position and in a third plane which is defined by the axis of the pointer and said reference point until the shadow of the pointer has moved a distance equal to and in the same direction as the movement of the shadow of the object, (7) and then marking upon the surface of the body the points of intersection of the first line with the surface of the body and the intersection of the axis of the pointer in its last position with the surface of the body, whereby the object may be found at the intersections of the lines so defined.

In witness whereof, I hereunto subscribe my name this 12th day of July, A. D. 1919.

AMÉDÉE GRANGER.

Witnesses:
J. I. DE GRANGE, M. D.,
H. P. McLEAN.